United States Patent
Liu et al.

(10) Patent No.: US 8,520,336 B1
(45) Date of Patent: Aug. 27, 2013

(54) MAGNETIC RECORDING HEAD WITH NANO SCALE POLE TIP BULGE

(75) Inventors: Feng Liu, San Ramon, CA (US); Tao Pan, San Jose, CA (US); Zhigang Bai, Milpitas, CA (US); Yugang Wang, Milpitas, CA (US); Sining Mao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 7 days.

(21) Appl. No.: 13/315,098

(22) Filed: Dec. 8, 2011

(51) Int. Cl.
*G11B 5/127* (2006.01)

(52) U.S. Cl.
USPC .................................. 360/125.1; 360/125.14

(58) Field of Classification Search
USPC ............... 360/125.09, 125.1, 125.11, 125.13, 360/125.14, 125.15, 125.03
See application file for complete search history.

(56) References Cited

U.S. PATENT DOCUMENTS

| | | | |
|---|---|---|---|
| 5,801,910 A * | 9/1998 | Mallary | 360/125.65 |
| 5,805,391 A | 9/1998 | Chang et al. | |
| 6,255,040 B1 | 7/2001 | Sasaki | |
| 6,327,116 B1 | 12/2001 | Watanabe et al. | |
| 6,330,127 B1 * | 12/2001 | Sasaki | 360/125.65 |
| 6,497,825 B1 | 12/2002 | Kamijima | |
| 6,525,904 B1 | 2/2003 | Sasaki | |
| 6,798,616 B1 | 9/2004 | Seagle et al. | |
| 6,804,088 B1 * | 10/2004 | Nonaka et al. | 360/317 |
| 7,061,717 B2 | 6/2006 | Takano | |
| 7,133,253 B1 | 11/2006 | Seagle et al. | |
| 7,372,664 B1 * | 5/2008 | Mallary et al. | 360/123.02 |
| 7,558,019 B2 | 7/2009 | Le et al. | |
| 7,593,186 B2 | 9/2009 | Bedell et al. | |
| 7,688,546 B1 * | 3/2010 | Bai et al. | 360/125.02 |
| 7,736,823 B1 | 6/2010 | Wang et al. | |
| 7,779,534 B2 | 8/2010 | Matono | |
| 7,872,535 B2 | 1/2011 | Anand | |
| 8,116,033 B2 * | 2/2012 | Kameda et al. | 360/125.1 |
| 8,179,636 B1 * | 5/2012 | Bai et al. | 360/125.17 |
| 8,184,399 B2 * | 5/2012 | Wu et al. | 360/125.15 |
| 8,233,233 B1 * | 7/2012 | Shen et al. | 360/125.03 |
| 8,289,649 B2 * | 10/2012 | Sasaki et al. | 360/125.13 |
| 2006/0139801 A1 * | 6/2006 | Kamada | 360/125 |
| 2008/0239569 A1 | 10/2008 | Yazawa et al. | |
| 2008/0297952 A1 | 12/2008 | Kameda et al. | |
| 2008/0316644 A1 | 12/2008 | Lee et al. | |
| 2009/0091861 A1 | 4/2009 | Takano et al. | |
| 2009/0290257 A1 | 11/2009 | Kimura et al. | |
| 2010/0149688 A1 | 6/2010 | Le et al. | |
| 2010/0328816 A1 | 12/2010 | Guan et al. | |

* cited by examiner

*Primary Examiner* — Brian Miller

(57) ABSTRACT

A perpendicular magnetic recording head for use in a hard disk drive has a main pole that has a main pole tip in proximity to an air bearing surface. The main pole tip has a first width at the ABS, extending distally at a first angle measured from the plane of the ABS to a second width measured at a first distance from the ABS. The main pole tip extends distally at a second angle measured from the plane of the ABS from the second width to a third width, wherein the second angle is less than the first angle. The main pole tip extends distally at a third angle measured from the plane of the ABS from the third width to a fourth width, wherein the third angle is greater than the second angle. The first distance is between 25 and 100 nanometers.

22 Claims, 4 Drawing Sheets

MAGNETIC RECORDING HEAD WITH NANO SCALE POLE TIP BULGE

BACKGROUND OF THE INVENTION

Disk drives typically use heads residing on sliders to read from and write to the magnetic media. Read and write transducers residing in the head are flown at a small, controlled spacing above the magnetic medium during read and write operations. An air bearing forms between the head and the disk due to the disk rotating at high speeds to provide controlled head to disk spacing. Magnetic fields emanating from the write transducer pole tip switches magnetization of the magnetic medium, i.e., writing to the medium. Among other factors, a smaller and more tightly controlled magnetic writing field will allow more data to be written in the same space, thereby increasing areal density.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
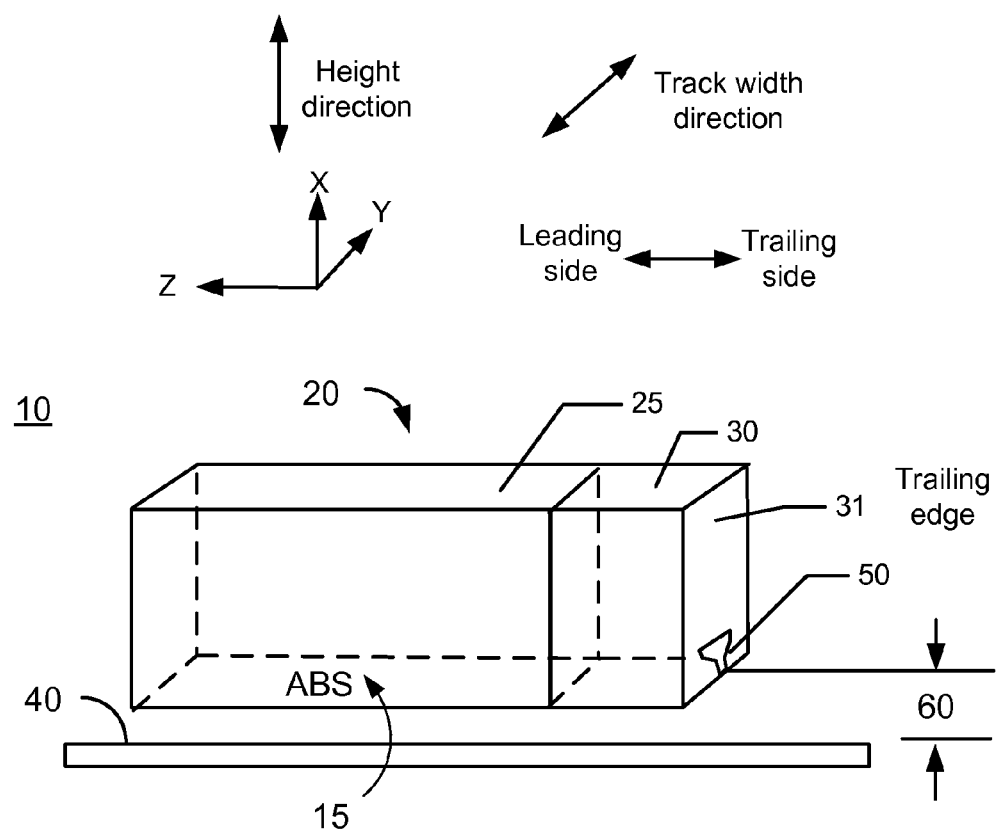
FIG. 1 illustrates a hard disk drive, in accordance with one aspect of the subject invention.

FIG. 1 illustrates a hard disk drive (HDD) 10 that includes a slider 20 and recording media 40. Slider 20 includes body 25 and a magnetic recording head 30 on the trailing side of body 25. Body 25 may be much larger than magnetic recording head 30, and figures are highly simplified for clarity. Slider 20 has a bottom surface 15, hereinafter called an air bearing surface (ABS), which faces recording media 40. During operation, recording media 40 rotates under slider 20, and due to aerodynamic forces generated between ABS 15 and recording media 40, floats a fly height distance 60 above media 40. Recording head 30 includes a write transducer 50, which may be mounted in proximity to trailing edge 31 of magnetic recording head 30 facing ABS 15. Fly height 60 is typically measured as the distance between the nearest part of write transducer 50 and media 40.

Figure 2A:
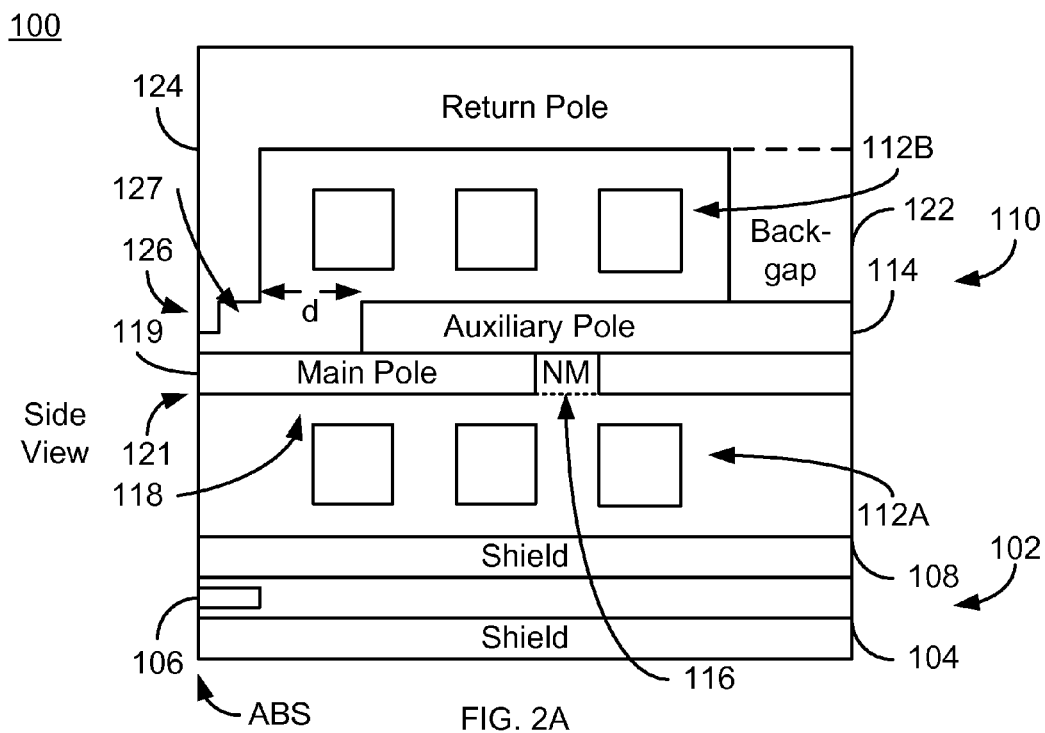
FIG. 2A illustrates side view of a portion of a perpendicular magnetic head in accordance with one aspect of the subject invention.
Figure 2B:
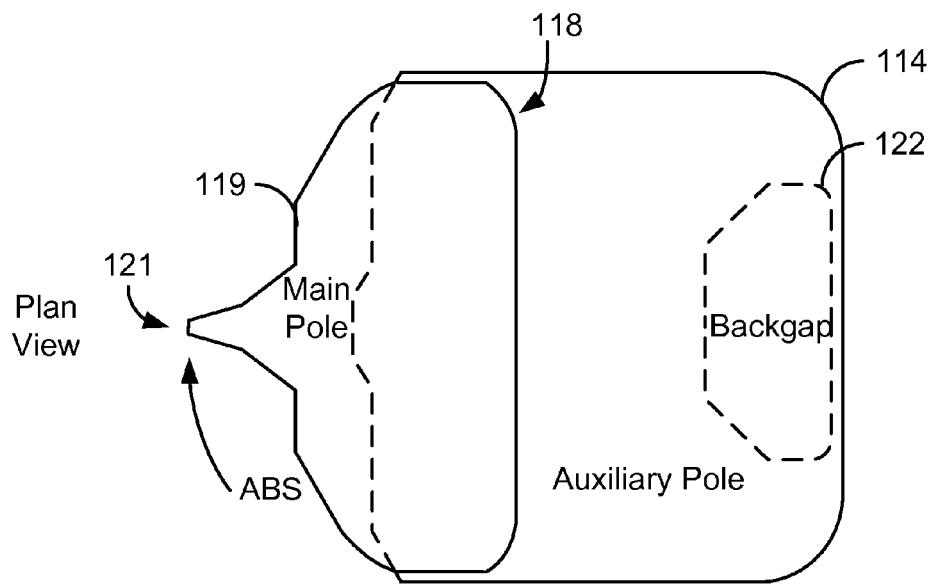
FIG. 2B illustrates plan view of a portion of a perpendicular magnetic head in accordance with one aspect of the subject invention.

FIG. 2A illustrates a diagram depicting a side view of a portion of a perpendicular magnetic recording (PMR) head 100. FIG. 2B illustrates a diagram depicting a plan view of a portion of a perpendicular magnetic recording (PMR) head 100 shown in FIG. 2A. For clarity, FIGS. 2A-B are not to scale. Further, only some of the components depicted in FIG. 2A side view are also shown in FIG. 2B plan view. For simplicity not all portions of the PMR head 100 are shown. In addition, although the PMR head 100 is depicted in the context of particular components, other and/or different components may be used. Further, the arrangement of components may vary in different embodiments. PMR head 100 has an ABS configured to reside close to a media (not shown) during operation. The PMR head 100 is a merged head including a read transducer 102 and a write transducer (PMR transducer) 110. The read transducer 102 includes shields 104 and 108 as well as read sensor 106. In other embodiments, the PMR head 100 may include only the PMR transducer 110.

The PMR transducer 110 may be considered to include the shield 108. In addition, the PMR transducer 110 includes coil(s) 112A and 112B, auxiliary pole(s) 114, nonmagnetic spacer 116, main pole 119, back gap 122 and return pole 124. In some embodiments, the PMR transducer 110 may have other magnetic components, such as a wraparound shield or side shields that are not shown. For clarity, the outer edges of the main pole 118, auxiliary pole 114, and back gap 122 are shown in the plan view as residing at different locations. However, in some embodiments, the edges may overlap.

Main pole 119 has a pole tip 121 that occupies a portion of the ABS. The pole tip 121 region of main pole 119 may have an ABS-facing surface that has a top, i.e., a leading edge, wider than the bottom or trailing edge (not shown). Thus, the first main pole 119 may have a reverse angle. Further, although not shown, the pole tip 121 of main pole 119 may have top and/or bottom bevels such that the first main pole piece 119 is taller distal from the ABS. However, in other embodiments, the first main pole piece 119 may have other shapes. The first main pole piece 119 extends from the ABS to overlap the auxiliary pole 114. Thus, portions of the auxiliary pole 114 are shown by dashed lines in the plan view. The main pole 119 may terminate between the back gap 122 and the ABS.

The main pole 119 and auxiliary pole 114 may have different shapes than are shown in FIG. 2B, and the figures are simplified for clarity.

The auxiliary pole 114 may be magnetically coupled with main pole 119 and with the back gap 122. The auxiliary pole 114 may be recessed from the ABS and resides between the main pole 119 and the return pole 124. A single auxiliary pole 114 is shown in FIG. 2A and FIG. 2B. However, in other embodiments, multiple auxiliary poles and/or auxiliary pole (s) having other locations or configurations might be used. For example, in another embodiment, the main pole 119 may be between the auxiliary pole 114 and the return pole 124. In some embodiments, the thickness of the auxiliary pole 114 may be at least 0.6 and not more than 1.5 µm. Further, the saturation magnetization of the auxiliary pole 114 may also be in the range of 1.0-2.4 T. However, other thicknesses and saturation magnetizations may be used. As can be seen in FIG. 2A, the auxiliary pole 114 may be desired to have its front edge at least a distance, d, from the back side of the pedestal 126. This separation may be desired to ensure that the pole 114 and pedestal 126 are not magnetically connected near the ABS. In some embodiments, this distance may be desired to be at least 0.2 micron. However, in other embodiments, the distance between the pedestal 126 back and the front of the auxiliary pole 114 may be at least 0.5 micron.

The back gap 122 magnetically couples the back portions of the auxiliary pole(s) 114 and the return pole 124. In some embodiments, the return pole 124 and back gap 122 may be considered to act as a single entity and thus are separated by a dashed line in FIG. 2. The return pole 124 also includes a pedestal 126. In the embodiment shown, the pedestal 126 is shown as having a notch 127 near its back surface. However, in other embodiments, the pedestal 126 may have different shapes. For example, the pedestal 126 may be free of the notch or may be sloped instead of notched. The coil(s) 112A/112B are shown as helical coils. However, in other embodiments, other coils including but not limited to pancake coils may be used. For example, coils may encircle the back gap, or form any orientation to provide a magnetic field to the pole(s).

To write to the media, a current is driven through the coil(s) 112A/112B. The main pole 119 is thus energized. A magnetic field is concentrated by the shape of the main pole 119 to high intensity in the area of the pole tip 121 at the ABS. The shape of main pole 119 and pole tip 121 near to the ABS will significantly affect magnetic write fields between the pole tip and the recording media.

Figure 3:
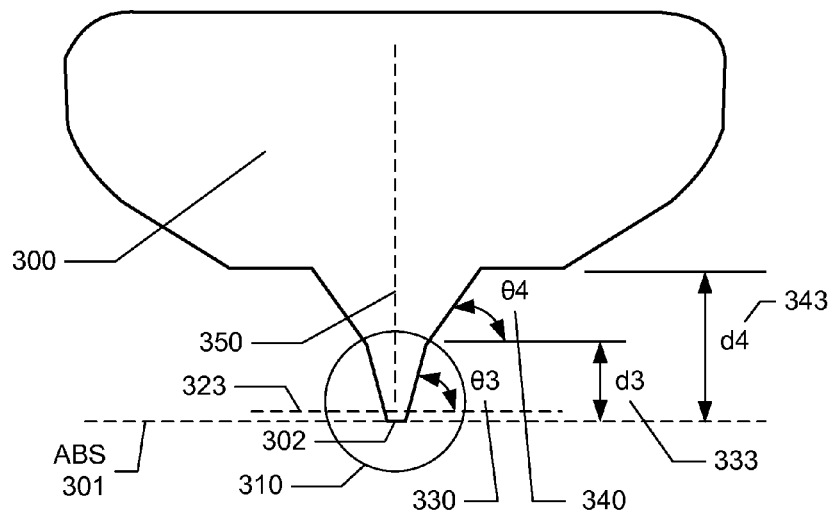
FIG. 3 illustrates a plan view of a main pole in accordance with one aspect of the subject invention.

FIG. 3 illustrates a plan view of main pole 300 similar to main pole 119 illustrated in FIG. 2B. Some details of pole tip 310 are not shown in FIG. 3 due to the relative scale of the dimensions involved, and they will be described in the following figures and descriptions.

Pole tip 310 has a surface 302 that faces the ABS 301. In the embodiment illustrated in FIG. 3, surface 302 is illustrated as having a flat bottom at the ABS centered about pole center line 350. In another embodiment (not shown), surface 302 may not have a flattened area at the ABS 301, but may terminate at the ABS 301 in a very small surface or a point. Main pole 300 and pole tip 310 are illustrated as substantially symmetric about center line 350; however, non-symmetric embodiments may be incorporated within the scope of the invention. Indeed, some asymmetry is not uncommon at nanometer scale, and process variability may introduce some differences; therefore, angles and dimensions are not limited by the embodiments shown.

FIG. 3 shows pole tip 310 flaring out at a third angle (θ3) 330 from a height 323 above the ABS 301. Between third angle (θ3) 330 and the ABS 301 are a first angle and a second angle, not shown in FIG. 3 and shown in FIG. 4. Pole tip 310 extends at third angle (θ3) 330 for a third distance (d3) 333 from ABS 301 where the angle changes to a fourth angle (θ4) 340. Fourth angle (θ4) 340 begins at distance (d3) 333 and extends to distance (d4) 343 from the ABS 301.

Figure 4:
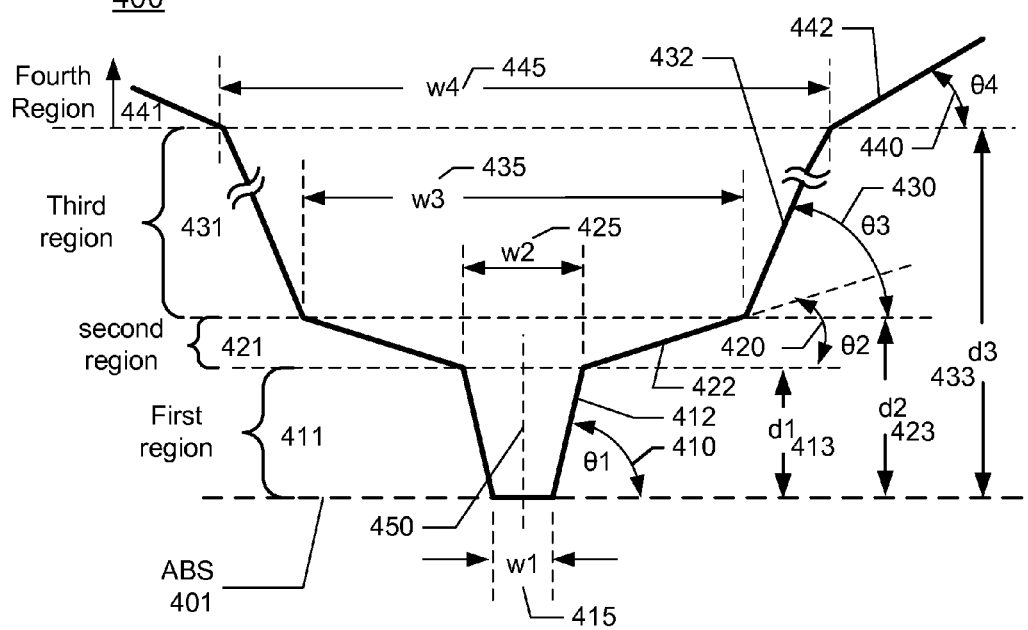
FIG. 4 illustrates a portion of a main pole tip in accordance with one aspect of the subject invention.

FIG. 4 illustrates pole tip 400 in an enlarged view of a portion of pole tip 310 shown in FIG. 3. In one embodiment, pole tip 400 may be a perpendicular magnetic recording pole. In one embodiment, pole tip 400 may be substantially symmetric with respect to pole center line 450. The following descriptions and explanations apply to both sides of the pole 400; i.e., distances and angles on both sides of center line 400 may be the same on both sides of the center line 450 within the limits provided herein.

Pole tip 400 has four regions. The first region 411 is nearest to ABS 401 and extends a height (d1) 413 from ABS 401. Pole tip 400 in first region 411 has a first width (w1) 415 at ABS 401 and second width (w2) 425 at distance (d1) 413 from ABS 401. In one embodiment, first distance (d1) 413 may be between 25 nm and 100 nm. In another embodiment, first distance (d1) is between 50 nm and 75 nm. In one embodiment, first width (w1) 415 may be at least 15 nanometers (nm) and less than 60 nm; and in another embodiment, first width (w1) 415 may be at least 15 nanometers (nm) and less than 80 nm. In another embodiment, first width (w1) 415 may be at least 30 nanometers (nm) and less than 200 nm. In one embodiment, first width (w1) 415 may correspond to that of a mere point. In other aspects, first width (w1) 415 may be adapted for a preferred track width; for example, to optimize for non-overlapping tracks, overlapping (shingled) tracks, for energy assisted recording, or other recording methods. In one embodiment, second width (w2) 425 may be equal to or greater than first width (w1) 415. In one embodiment, second width (w2) 425 may be greater than first width (w1) 415 by at least 100 nm and no more than 400 nm. Pole tip 400 extends distally from ABS 401 to first distance (d1) 413 forming a first side wall 412 at a first angle (θ1) 410 measured from the plane of ABS 401. In one embodiment, first angle (θ1) 410 may be greater than 50 degrees and less than 90 degrees. In a further embodiment first angle (θ1) 410 may be greater than 35 degrees and less than 90 degrees. In another embodiment, first angle (θ1) 410 may be greater than 60 degrees and less than 90 degrees.

The second region 421 begins at first distance (d1) 413 from ABS 401 and extends distally to a second distance (d2) 423. In one embodiment, second distance (d2) 423 may be greater than 50 nm and less than 300 nm. Second region 421 has second width (w2) 425 at first distance (d1) 413 from ABS 401 and third width (w3) 435 at second distance (d2) 423 from ABS 401, thereby forming a second side wall 422 at a second angle (θ2) 420 as measured from the plane of ABS 401. In one embodiment, second angle (θ2) 420 may be less than first angle (θ1) 410. In one embodiment, second angle (θ2) 420 may be less than 45 degrees. In a further embodiment, second angle (θ2) 420 may be greater than 25 degrees and less than 35 degrees. In another embodiment second angle (θ2) 420 may be greater than 25 degrees and less than 45 degrees.

The third region 431 begins at second distance (d2) 423 from ABS 401 and extends distally to a third distance (d3) 433. In one embodiment, third distance (d3) 433 may be at least 800 nm from ABS 401. In another embodiment, third distance (d3) 433 may be at least 500 nm from ABS 401. Third region 431 has third width (w3) 435 at second distance (d2) 423 and fourth width (w4) 445 at third distance (d3) 433, thereby forming a third side wall 432 at a third angle (θ3) 430 as measured from the plane of ABS 401. In one embodiment, third angle (θ3) 430 may be greater than second angle (θ2) 420.

The fourth region 441 begins at third distance (d3) 433 from ABS 401 and extends distally to a fourth distance (d4 343, shown in FIG. 3), thereby forming a fourth side wall 442 at a fourth angle (θ4) 440 as measured from the plane of ABS 401. In one embodiment, fourth angle (θ4) 440 is greater than third angle (θ3) 430.

For clarity, side walls 412, 422, 432, and 442 are illustrated as straight lines with precise corners, and in one embodiment, at least one of side walls 412, 422, 432, and 442 are substantially straight. As a practical matter, transitions between side walls may have slight curvature and side walls may have slight irregularity; and in one embodiment, angles and distances may be considered best fit, first order (linear) approximations. In another embodiment, side wall angles may be calculated by well known statistical approximation methods such as mean squared error (MSE) to approximate linear fitting of each side wall.

Figure 5:
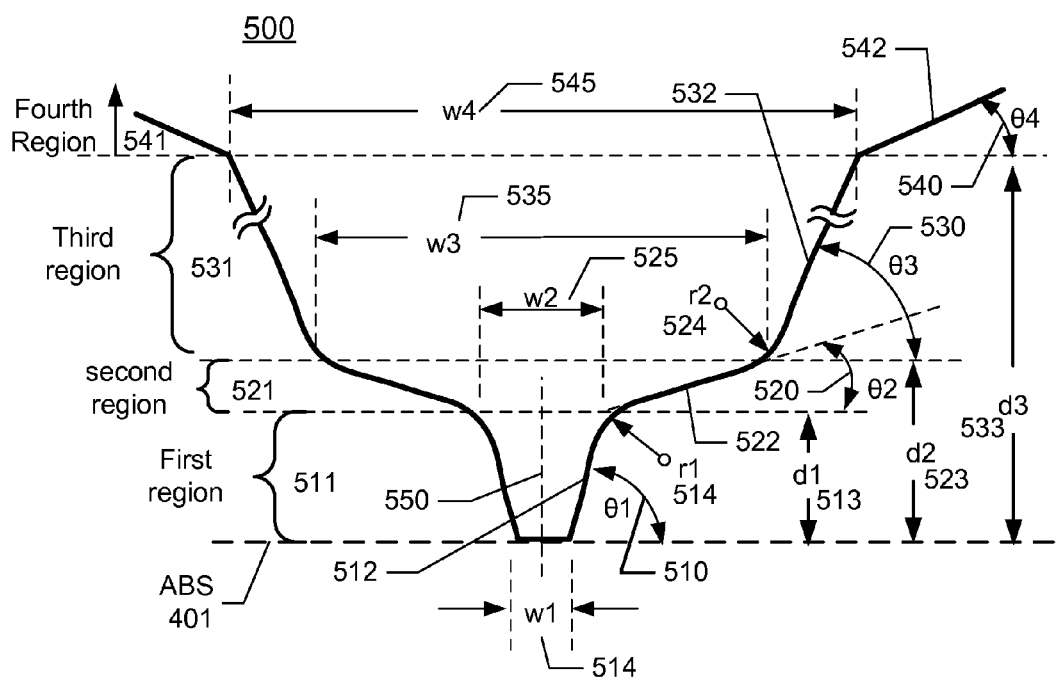
FIG. 5 illustrates a portion of a main pole tip with a curved bulge in accordance with one aspect of the subject invention.

FIG. 5 is similar to FIG. 4, however different in that the transitions between the first region 511 and the second region 521 has a first radius (r1) 515, and the transition between the second region 521 and the third region 531 has a second radius (r2) 524.

FIG. 5 illustrates pole tip 500 in an enlarged view of a portion of pole tip 310 shown in FIG. 3. In one embodiment, pole tip 500 may be a perpendicular magnetic recording pole. In one embodiment, pole tip 500 may be substantially symmetric with respect to pole center line 550. The following descriptions and explanations apply to both sides of the pole 500; i.e., distances, angles, and radii on both sides of center line 500 may be the same on both sides of the center line 550 within the limits provided herein.

Pole tip 500 has four regions. The first region 511 is nearest to ABS 501 and extends a height (d1) 513 from ABS 501. Pole tip 500 in first region 511 has a first width (w1) 515 at ABS 501 and second width (w2) 525 at distance (d1) 513 from ABS 501. In one embodiment, first distance (d1) 513 may be between 25 nm and 100 nm. In another embodiment, first distance (d1) 513 is between 50 nm and 75 nm. In one embodiment, first width (w1) 515 may be at least 15 nanometers (nm) and less than 60 nm; and in another embodiment, first width (w1) 515 may be at least 15 nanometers (nm) and less than 80 nm. In another embodiment, first width (w1) 515 may be at least 30 nanometers (nm) and less than 200 nm. In one embodiment, first width (w1) 515 may be a point (w1=0 nm). In other aspects, first width (w1) 515 may be adapted for a preferred track width; for example, to optimize for non-overlapping tracks, overlapping (shingled) tracks, for energy assisted recording, or other recording methods. In one embodiment, second width (w2) 525 may be equal to or greater than first width (w1) 515. In one embodiment, second width (w2) 525 may be greater than first width (w1) 515 by at least 100 nm and no more than 400 nm. Pole tip 500 extends distally from ABS 501 to first distance (d1) 513 forming a first side wall 512 at a first angle (θ1) 510 measured from the plane of ABS 501. In one embodiment, first angle (θ1) 510 may be greater than 50 degrees and less than 90 degrees. In a further embodiment first angle (θ1) 510 may be greater than 35 degrees and less than 90 degrees. In another embodiment, first angle (θ1) 510 may be greater than 60 degrees and less than 90 degrees.

The second region 521 begins at first distance (d1) 513 from ABS 501 and extends distally to a second distance (d2) 523. In one embodiment, second distance (d2) 523 may be greater than 50 nm and less than 300 nm. Second region 521 has second width (w2) 525 at first distance (d1) from ABS 501 and third width (w3) 535 at second distance (d2) 523 from ABS 401, thereby forming a second side wall 522 at a second angle (θ2) 520 as measured from the plane of ABS 501. In one embodiment, second angle (θ2) 520 is less than first angle (θ1) 510. In one embodiment, second angle (θ2) 520 may be less than 45 degrees. In a further embodiment, second angle (θ2) 520 may be greater than 25 degrees and less than 35 degrees. In another embodiment second angle (θ2) 420 may be greater than 25 degrees and less than 45 degrees.

The third region 531 begins at second distance (d2) 523 from ABS 501 and extends distally to a third distance (d3) 533. In one embodiment, third distance (d3) 533 is at least 800 nm from ABS 501. In another embodiment, third distance (d3) 433 is at least 500 nm from ABS 401. Third region 531 has third width (w3) 535 at second distance (d2) 523 and fourth width (w4) 545 at third distance (d3) 533, thereby forming a third side wall 532 at a third angle (θ3) 530 as measured from the plane of ABS 501. In one embodiment, third angle (θ3) 530 may be greater than second angle (θ2) 520.

The fourth region 541 begins at third distance (d3) 533 from ABS 501 and extends distally to a fourth distance (d4, shown in FIG. 3), thereby forming a fourth side wall 542 at a fourth angle (θ4) 540 as measured from the plane of ABS 501. In one embodiment, fourth angle (θ4) 540 may be greater than third angle (θ3) 530.

For clarity, side walls 512, 522, 532, and 542 are illustrated as straight lines with curved transitions; and in one embodiment, at least one of side walls 512, 522, 532, and 542 are substantially straight. As a practical matter, side walls may have slight irregularity; and in one embodiment, angles and distances may be considered best fit, first order (linear) approximations. In another embodiment, side wall angles may be calculated by well known statistical approximation methods such as mean squared error (MSE) to approximate linear fitting of each side wall.

In one embodiment, the curved transition joining first side wall 512 and second side wall 522 at the first radius (r1) 514 may have a radius of curvature of approximately 100 nm to 500 nm; and in another embodiment, the curved transition joining first side wall 512 and second side wall 522 at the first radius (r1) 514 may have a radius of curvature of approximately 150 nm to 400 nm.

In one embodiment, the curved transition joining second side wall 522 and third side wall 532 at the second radius (r2) 524 may have a radius of curvature greater than approximately 500 nm.

The main pole having the dimensions provided in the preceding embodiments provide a controlled bulge shape at a specified distance from the ABS. This bulge may be between the pole tip first angle (θ1) where the pole tip abuts the ABS, and the conventional flare angles, third angle (θ3) and fourth angle (θ4). By providing this bulge shape, embodiments of the invention provide an improved perpendicular magnetic recording writer. For example, the write field and field gradient may be improved to enable high recording areal density; it may allow for a large chisel angle yet having a large field of magnetic volume behind the ABS; off-track erasure may be improved by moving magnetic material distal from the ABS; and domain lock up issues may be mitigated due to pole tip anisotropy improved due to pole tip magnetic volume.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A magnetic recording head having an air-bearing surface (ABS) configured to reside in proximity to a recording media during use, the magnetic recording head comprising:

a main pole comprising a pole tip having a first width (w1) at the ABS, a second width (w2) at a first distance (d1) from the ABS, a third width (w3) at a second distance (d2) from the ABS, and a fourth width (w4) at a third distance (d3) from the ABS;

the pole tip extending distally from the first width (w1) to the second width (w2) wherein a first side wall extending from the ABS to the first distance (d1) of the pole tip forms a first angle (θ1) with respect to the ABS;

the pole tip widening distally from the second width (w2) to the third width (w3) wherein a second side wall extending from the first distance (d1) to the second distance (d2) of the pole tip forms a second angle (θ2) with respect to the ABS;

the pole tip widening distally from the third width (w3) to the fourth width (w4) wherein a third side wall extending from the second distance (d2) to the third distance (d3) of the pole tip forms a third angle (θ3) with respect to the ABS, wherein:

the second angle (θ2) is less than the first angle (θ1),
the third angle (θ3) is greater than the second angle (θ2), and
the first distance (d1) is between 25 and 100 nanometers (nm).

2. The magnetic recording head of claim 1 wherein the second angle (θ2) is less than 45 degrees.

3. The magnetic recording head of claim 1 wherein the first angle (θ1) is greater than 60 degrees and less than 90 degrees.

4. The magnetic recording head of claim 1 wherein the second distance (d2) is greater than 50 nm and less than 300 nm.

5. The magnetic recording head of claim 1 wherein the second width (w2) is larger than the first width (w1) by at least 100 nm and no more than 400 nm.

6. The magnetic recording head of claim 1 wherein the first width (w1) is at least 15 nm and no greater than 80 nm.

7. The magnetic recording head of claim 1 wherein the first width (w1) is at least 30 nm and no greater than 200 nm.

8. The magnetic recording head of claim 1 wherein the main pole is configured for perpendicular magnetic recording.

9. The magnetic recording head of claim 1 wherein the third distance (d3) is at least 800 nm from the ABS.

10. The magnetic recording head of claim 1 wherein the third distance (d3) is at least 500 nm from the ABS.

11. The magnetic recording head of claim 1 wherein the second angle (θ2) is greater than 25 degrees and less than 35 degrees.

12. The magnetic recording head of claim 1 wherein the first angle (θ1) is greater than 35 degrees and less than 90 degrees.

13. The magnetic recording head of claim 1 wherein the first distance (d1) is greater than 50 nm and less than 75 nm.

14. The magnetic recording head of claim 13 wherein at least one of the first side wall, second side wall, and third side wall is substantially straight.

15. The magnetic recording disk drive of claim 13 wherein the main pole is configured for perpendicular magnetic recording.

16. The magnetic recording head of claim 1 wherein at least one of the first side wall, second side wall, and third side wall is substantially straight.

17. The magnetic recording head of claim 1 wherein the first side wall and the second side wall are joined with a first curved side wall.

18. The magnetic recording head of claim 17 wherein the first curved side wall comprises a radius of curvature between approximately 100 nm and 500 nm.

19. The magnetic recording head of claim 17 wherein the first curved side wall comprises a radius of curvature between approximately 150 nm and 400 nm.

20. The magnetic recording head of claim 1 wherein the second side wall and the third side wall are joined with a second curved side wall.

21. The magnetic recording head of claim 20 wherein the second curved side wall comprises a radius of curvature greater than approximately 500 nm.

22. A magnetic recording disk drive comprising:
a slider;
a magnetic recording head having an air-bearing surface (ABS) configured to reside in proximity to a recording media during use, the magnetic recording head comprising:
a main pole comprising a pole tip having a first width (w1) at the ABS, a second width (w2) at a first distance (d1) from the ABS, a third width (w3) at a second distance (d2) from the ABS, and a fourth width (w4) at a third distance (d3) from the ABS;
the pole tip widening distally from the first width (w1) to the second width (w2) wherein a first side wall of the pole tip forms a first angle (θ1) with respect to the ABS;
the pole tip widening distally from the second width (w2) to the third width (w3) wherein a second side wall of the pole tip forms a second angle (θ2) with respect to the ABS;
the pole tip widening distally from the third width (w3) to the fourth width (w4) wherein a third side wall of the pole tip forms a third angle (θ3) with respect to the ABS, wherein:
the second angle (θ2) is less than the first angle (θ1),
the third angle (θ3) is greater than the second angle (θ2),
the first distance (d1) is between 50 and 75 nanometers (nm),
the second angle (θ2) is greater than 25 degrees and less than 45 degrees;
the first angle (θ1) is greater than 60 degrees and less than 90 degrees, and
the second distance (d2) is greater than 50 nm and less than 300 nm.

* * * * *